(12) United States Patent
Muegge et al.

(10) Patent No.: US 11,193,646 B2
(45) Date of Patent: Dec. 7, 2021

(54) LIGHTING DEVICE FOR VEHICLES

(71) Applicants: Hella KGaA Hueck & Co., Lippstadt (DE); Covestro Deutschland AG, Leverkusen (DE)

(72) Inventors: Martin Muegge, Geseke (DE); Carsten Hohmann, Warstein (DE); Rainer Hagen, Leverkusen (DE); Guenther Walze, Cologne (DE); Thomas Faecke, Leverkusen (DE)

(73) Assignees: Hella KGaA Hueck & Co., Lippstadt (DE); Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/538,287

(22) PCT Filed: Dec. 18, 2015

(86) PCT No.: PCT/DE2015/100541
§ 371 (c)(1),
(2) Date: Jun. 21, 2017

(87) PCT Pub. No.: WO2016/101948
PCT Pub. Date: Jun. 30, 2016

(65) Prior Publication Data
US 2017/0327033 A1    Nov. 16, 2017

(30) Foreign Application Priority Data

Dec. 22, 2014    (DE) .................... 10 2014 119 326.1

(51) Int. Cl.
*F21S 43/20*    (2018.01)
*G02B 5/32*    (2006.01)
(Continued)

(52) U.S. Cl.
CPC ............ *F21S 43/26* (2018.01); *B60Q 1/2619* (2013.01); *B60Q 1/2696* (2013.01); *B60Q 1/30* (2013.01);
(Continued)

(58) Field of Classification Search
CPC .. B60Q 1/2619; B60Q 1/2696; B60Q 1/0047; F21S 43/26; F21S 41/28; F21S 41/285;
(Continued)

(56) References Cited

U.S. PATENT DOCUMENTS 4,722,037 A * 1/1988 Davis ................... F21S 48/1145
359/15
4,966,426 A * 10/1990 Moss ..................... B60Q 1/302
359/15
(Continued)

FOREIGN PATENT DOCUMENTS

DE    4421306 A1    1/1995
DE    102012107770 A1    5/2014
(Continued)

OTHER PUBLICATIONS

English language translation of first Chinese Office Action dated May 7, 2019, in Chinese Application No. 201580070104.2.
(Continued)

*Primary Examiner* — Erin Kryukova
(74) *Attorney, Agent, or Firm* — Patent Central LLC; Stephan A. Pendorf

(57) ABSTRACT

A lighting device for vehicles, in particular a signal light, with a light source for emitting a light beam and an optical unit associated with the light source for producing a predetermined light function, the optical unit having a holographic element and a lens arranged in the main emission direction in front of the holographic element, the holographic element comprising such a diffraction structure that
(Continued)

Figure 1:
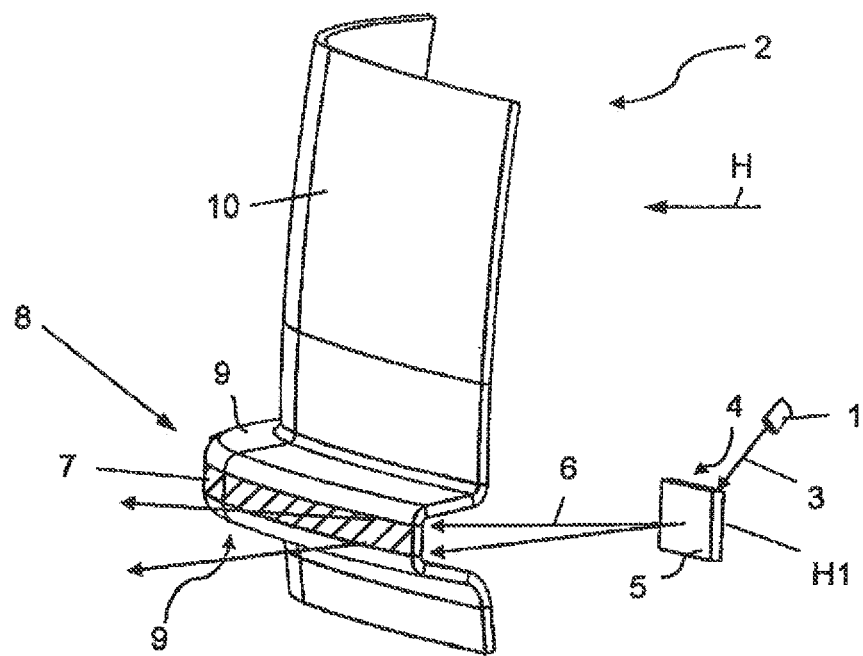

the light beam emitted from the light source onto the holographic element is varied according to a predetermined illumination pattern such that the holographic light beam lights an illumination surface of the lens to generate the light function.

8 Claims, 4 Drawing Sheets

(51) Int. Cl.

| | | |
|---|---|---|
| G03H 1/22 | (2006.01) | |
| G03H 1/30 | (2006.01) | |
| G03H 1/28 | (2006.01) | |
| G03H 1/02 | (2006.01) | |
| B60Q 1/26 | (2006.01) | |
| B60Q 1/30 | (2006.01) | |
| F21V 5/00 | (2018.01) | |
| F21V 5/04 | (2006.01) | |

(52) U.S. Cl.
CPC ............... *F21V 5/003* (2013.01); *F21V 5/04* (2013.01); *G02B 5/32* (2013.01); *G03H 1/0248* (2013.01); *G03H 1/2286* (2013.01); *G03H 1/28* (2013.01); *G03H 1/30* (2013.01); *G03H 1/2202* (2013.01); *G03H 2001/2234* (2013.01); *G03H 2222/34* (2013.01)

(58) Field of Classification Search
CPC ....... F21V 5/003; F21V 5/004; G02B 5/0252; G02B 5/203; G02B 5/32; G02B 27/0944; G03H 1/0248; G03H 1/30; G03H 2001/2615; F21Y 2115/10; F21Y 2115/30
See application file for complete search history.

(56) References Cited

U.S. PATENT DOCUMENTS

| | | | | |
|---|---|---|---|---|
| 5,101,193 | A * | 3/1992 | Smith .................... | B60Q 1/302 340/468 |
| 5,186,533 | A * | 2/1993 | Hori ...................... | B60Q 1/302 340/479 |
| 5,455,747 | A * | 10/1995 | Aoyama ................. | F21S 43/15 362/545 |
| 5,488,493 | A * | 1/1996 | Moss .................... | B60Q 1/302 359/13 |
| 5,495,227 | A * | 2/1996 | Wreede ................. | B60Q 1/302 340/479 |
| 5,571,277 | A * | 11/1996 | Allred ................... | B60Q 1/302 340/479 |
| 5,724,161 | A * | 3/1998 | Smith ................ | G02B 27/0103 349/34 |
| 5,816,681 | A * | 10/1998 | Tedesco .................. | F21V 5/002 362/459 |
| 5,963,345 | A * | 10/1999 | Smith ...................... | B60Q 1/50 359/1 |
| 6,616,299 | B2 * | 9/2003 | Martineau ............... | F21V 5/045 362/235 |
| 7,387,413 | B2 * | 6/2008 | Brinkmann ............. | F21V 5/002 362/460 |
| 8,317,379 | B2 * | 11/2012 | Oomen | |
| 8,702,258 | B2 * | 4/2014 | Toko ....................... | F21V 5/002 362/84 |
| 2003/0223246 | A1 * | 12/2003 | Albou ..................... | B60Q 1/14 362/539 |
| 2005/0156178 | A1 * | 7/2005 | Takeda .................. | F21S 41/155 257/79 |
| 2005/0200962 | A1 * | 9/2005 | Voloschenko ....... | G02B 5/0278 359/630 |
| 2008/0068852 | A1 * | 3/2008 | Goihl ..................... | F21V 5/002 362/509 |
| 2010/0302794 | A1 * | 12/2010 | Oomen ................ | B60Q 1/0017 362/519 |
| 2012/0212933 | A1 * | 8/2012 | Toko ....................... | F21V 5/002 362/84 |
| 2014/0307457 | A1 * | 10/2014 | Chen ...................... | F21S 43/10 362/516 |
| 2015/0241609 | A1 * | 8/2015 | Michiels .............. | G02B 5/0215 362/235 |

FOREIGN PATENT DOCUMENTS

| | | | |
|---|---|---|---|
| DE | 102013100561 | A1 | 7/2014 |
| EP | 0879990 | A2 | 11/1996 |
| JP | 06302203 | A | 10/1994 |
| JP | 1083707 | A | 3/1998 |
| JP | 10223006 | A | 8/1998 |
| JP | H1120567 | A * | 1/1999 |
| JP | 3068448 | B2 | 7/2000 |
| JP | 2013171645 | A | 9/2013 |

OTHER PUBLICATIONS

Chinese Office Action (with English language translation) dated Jan. 9, 2020, in Chinese Application No. 201580070104.2.
International Search Report in International Application No. PCT/DE2015/100541 dated May 25, 2016.

* cited by examiner

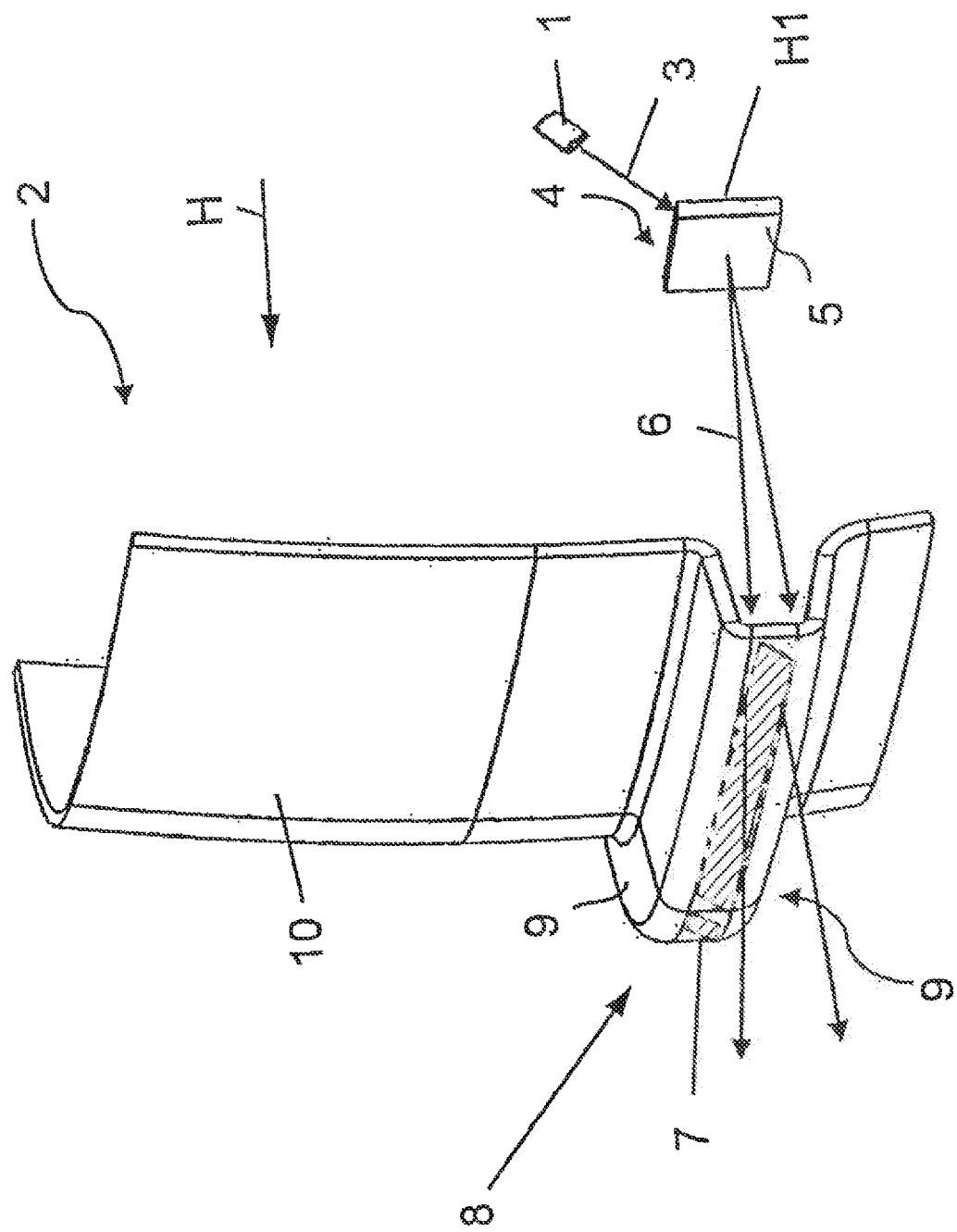

LIGHTING DEVICE FOR VEHICLES

The invention relates to a lighting device for vehicles, in particular a signal light, comprising a light source for emitting a light beam and an optical unit associated with the light source for producing a predetermined light function, the optical unit having a holographic element and a lens arranged in the main emission direction in front of the holographic element.

A lighting device for vehicles, comprising a light source as well as a rod-shaped light guide as an optical unit, is known from DE 10 2013 100 561 A1. The rod-shaped light guide has a line-shaped surface for the coupling-out of light such that a predetermined light function can be generated. In order to achieve a high-quality appearance and to realize a light function typical of the brand, for example a tail light function, uniform illumination of the surface for the coupling-out of light of the light guide is required. The optical outlay for this is relatively large since optical means such as light guides, lenses and, in particular, a large number of LED light sources have to be tailored to one another, in order to attain the desired uniform illumination. In particular, it is not possible according to the known lighting device to generate a luminous surface in a lens covering a light housing.

A lighting device for vehicles comprising a light source, on the one hand, and an optical unit, on the other hand, for generating a light distribution is known from JPH 10223006 A. The optical unit includes a reflector, a lens member, a lens as well as a holographic element such that the light function, on the one hand, is generated by a light beam emitted directly by the light source in the direction of the holographic element and, on the other hand, by a light beam which is reflected by the reflector. The holographic element is mounted on a transparent plate. The disadvantage of the known lighting device is the high complexity of the optical unit, which stems from the large number of different optical elements. The predetermined light function is substantially provided by the optical means, the reflector and lens, the holographic element merely having an auxiliary function.

The object of the present invention is to further develop a lighting device for vehicles in such a manner that, with less outlay, in particular with a lower number of light sources, a uniformly luminous surface for generating a signal function is attained.

In order to achieve this object, the invention in conjunction with the preamble of Claim 1 is characterized in that the holographic element comprises such a diffraction structure that the light beam emitted from the light source onto the holographic element is varied according to a predetermined illumination pattern such that the holographic light beam lights an illumination surface of the lens to generate the light function.

According to the invention, the effect of a holographic element is that an illumination pattern, which appears to be uniform, is provided on an illumination surface of a lens. The holographic element comprises such a diffraction structure that the light beam emitted from the light source is deflected according to the predetermined illumination pattern onto the illumination surface of the lens. As a result, light surfaces, luminous signatures and appearances can be advantageously generated. The holographic element serves as a beam shaper for illuminating a predetermined illumination surface in a defined manner. The light distribution information characterizing the illumination pattern is contained in the holographic element. The distribution of light onto the lens is therefore exclusively brought about by the holographic element. The lighting device therefore requires relatively few optical means such that the optical unit can be kept compact. Furthermore, the number of light sources can be reduced.

According to a preferred embodiment of the invention, the illumination surface of the lens is configured as a signature surface, in particular as a linear signature surface, which is at least delimited by a non-signature surface which is not hit by the holographic light beam. Depending on the configuration of the holographic element, the signature surface can be a single surface or consist of multiple partial surfaces. It can also comprise a graphical shaping, for example it can be in the form of a logo, a graphic, a recurring pattern (plurality of dots, plurality of lines, plurality of polygons, etc.). As a result, depending on the stylistic requirements of the signal function, a variable appearance as well as uniform illumination can be created.

According to a further development of the invention, the illumination surface of the lens can have a profiled configuration. In particular, if the illumination surface is configured as an illumination strip which rises from the plane of the lens, this produces a three-dimensional appearance of the lighting device. The property promoting a three-dimensional impression or an illusion of depth of the lighting device results from the fact that the holographic element comprises optical structures which are so small that they are invisible to the human eye. The holographic element can therefore be positioned inside a light housing of the lighting device, without adversely affecting the illusion of depth of said light housing. In particular, if the non-signature surface is free from scattering optical elements, if it is transparent for example, a light housing having an effect of depth is provided.

According to a further development of the invention, the illumination surface is provided with scattering optical elements which can be produced in particular by electrical discharge machining or etching or by lasering or by milling. The illumination surface therefore generates a scattering effect such that the light intensity values are provided for the desired signal function, for example for the tail light, brake light, turn signal light, rear fog light or reversing light. When the lamp is operating, an observer merely sees the lit illumination surface of the lens.

According to a further development of the invention, multiple illumination surfaces can preferably be arranged next to one another, with each of which a single holographic element as well as a single light source are associated. This can advantageously generate an elongated signature surface which extends, for example, in the three-dimensional space.

According to a further development of the invention, only a single holographic element can be associated with multiple illumination surfaces running in an arc, said single holographic element containing all of the light information required for the illumination surfaces. To generate the required light density multiple light sources are associated with the single holographic element.

According to a further development of the invention, there is associated with the illumination surface a second holographic element comprising such a lighting geometry and such a spectral acceptance that light which has been diffracted by the first holographic element and which reaches the second holographic element is also diffracted by said second holographic element. The second holographic element comprises such a holographic structure that the light is scattered in a manner corresponding to a Lambertian emitter and is radiated as an additional holographic light beam. As a result of the Lambertian emission characteristic of this second holographic element, the light scattered by it is perceived to be equally light from different viewing directions. In this way, the integration of conventional scattering optical elements in the illumination surface can be dispensed with.

According to a further development of the invention, the holographic element is configured as a volume holographic element, by means of which the light beam is diffracted within a defined angular and/or spectral range.

According to a further development of the invention, the holographic element is configured as a surface holographic element, preferably in the form of a film or as an injection-molded part (additional lens), by means of which the light beam is diffracted within a defined angular and/or spectral range.

According to a further development of the invention, the holographic element is designed as a diffractive optical structure on a film, a glass plate or on an additional lens made of plastic, by means of which the light beam is diffracted within a defined angular and/or spectral range.

According to a further development of the invention, the holographic element is a greater distance from the lens than from the light source. The holographic light beam emitted at a limited aperture angle can advantageously generate a relatively wide illumination surface.

Further advantages of the invention are set out in the additional subordinate claims.

Figure 2:
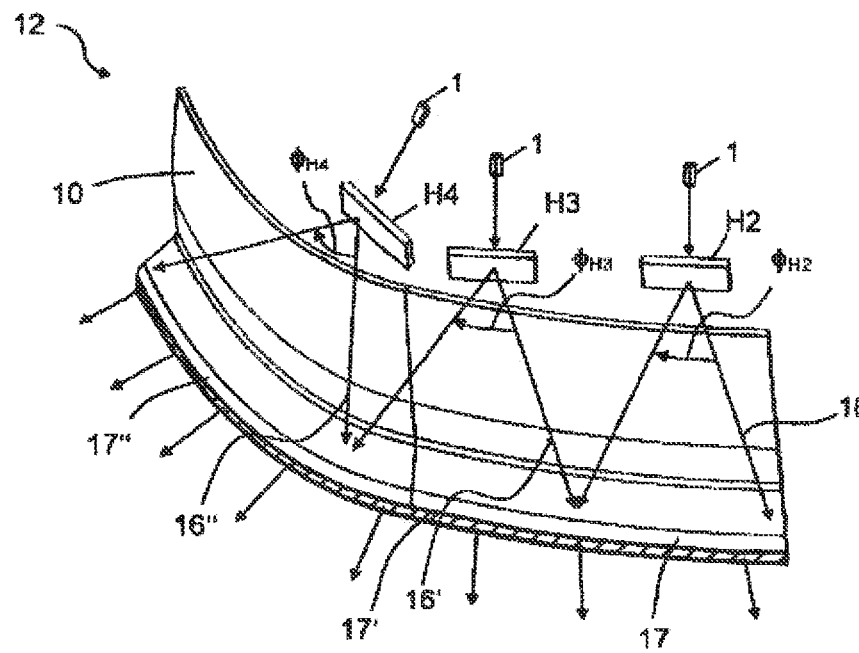
Figure 3:
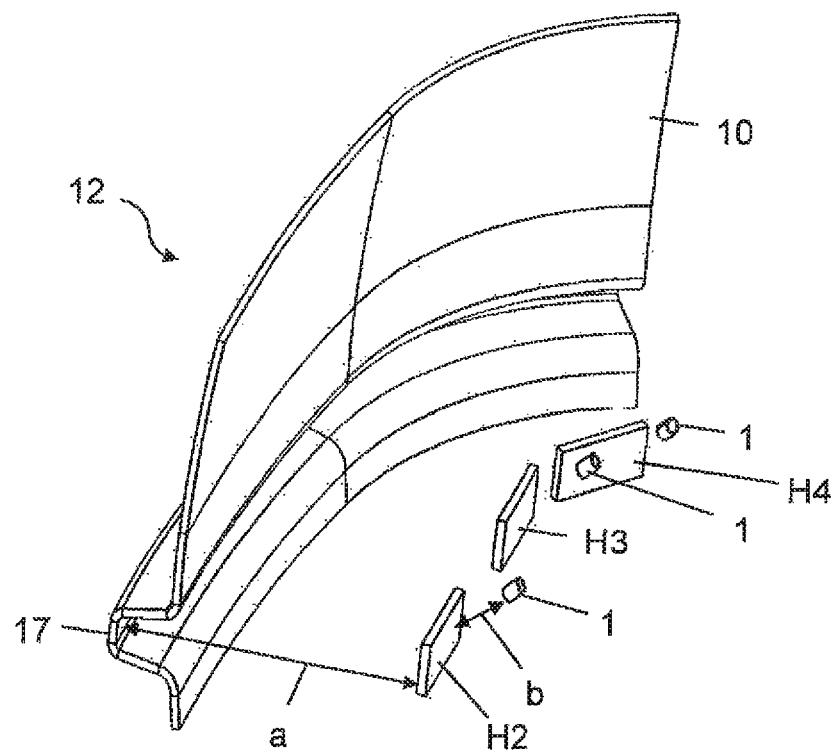
Figure 4:
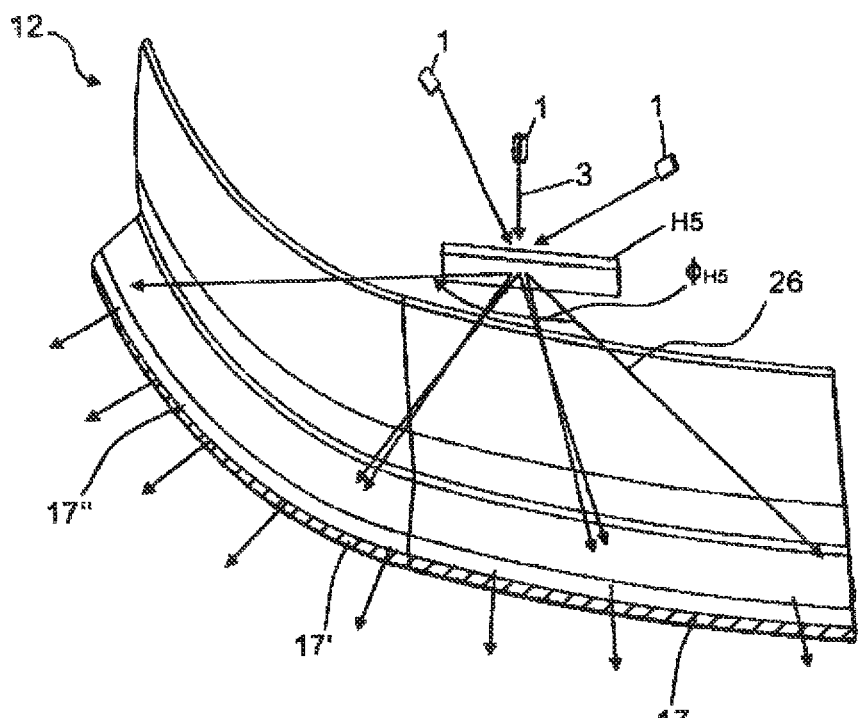
Figure 5:
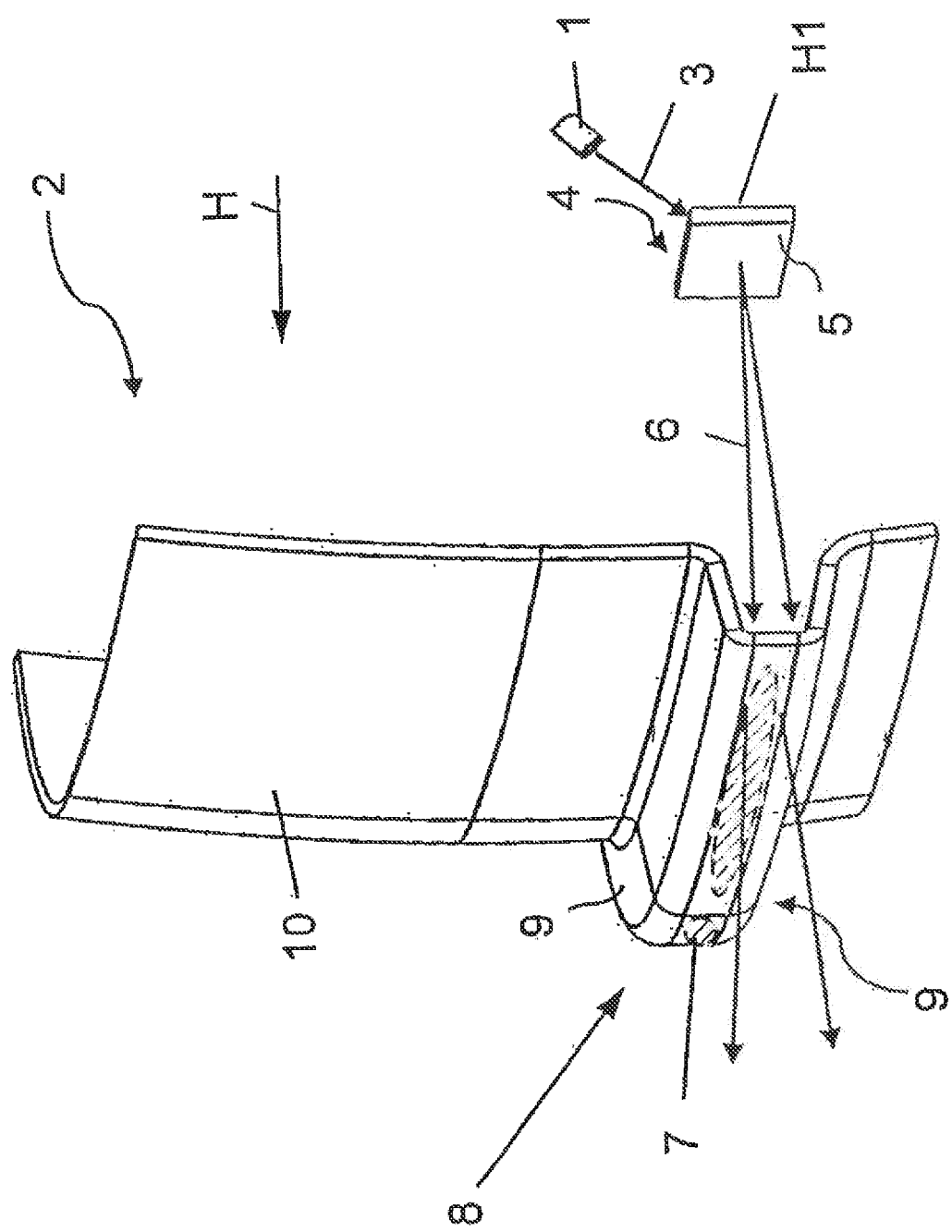

Embodiment examples of the invention are explained in more detail below, with reference to the drawings, wherein:

FIG. 1 shows a perspective representation of a lighting device having a holographic element and an illumination surface integrated in a lens according to a first embodiment of the invention, viewed from the front side, FIG. 2 shows a perspective front view of the lighting device according to a second embodiment having a plurality of illumination surfaces of holographic elements and the respectively associated light sources, FIG. 3 shows a side view of the lighting device according to FIG. 2, FIG. 4 shows a perspective front view of a lighting device according to a third embodiment having a single holographic element with which multiple illumination surfaces are associated, and FIG. 5 shows a perspective representation of the lighting device of FIG. 1 with lens including an elliptical signature surface, and FIG. 6 shows a perspective representation of the lighting device of FIG. 1 with lens including a polygonal signature surface.

A lighting device according to the invention can be arranged in the front and rear area of vehicles in order to generate a light distribution. For example, the lighting device can be configured as a signal light in the rear area in order to generate a tail light, brake light, turn signal light, rear fog light or reversing light function.

According to a first embodiment of the lighting device according to FIG. 1, the lighting device is formed by a lighting unit which comprises a light source 1, a holographic element H1 and a lens 2. The light source 1 can be configured as a LED light source or as a laser diode. The light source 1 is configured as a semiconductor-based light source, from which a light beam 3 is emitted in a virtually punctiform manner in the direction of a rear flat side 4 of the holographic element H1.

The holographic element H1 has a flat and/or plate-shaped configuration, a holographic film or holographic layer being mounted on a transparent, sufficiently rigid supporting surface. The supporting surface can be a film or a plate. The holographic film or holographic layer can be integrated into the holographic element H1 by means of an optically transparent top coat and/or an optically transparent adhesive or a further film or a further plate. The holographic element H1 comprises a front flat side 5 running parallel to the rear flat side 4, from which front flat side a holographic light beam 6 is emitted in the direction of an illumination surface including illuminated signature surface 7 of the lens 2 delimited by a non-signature surface which is not hit by the holographic light beam.

The holographic element H1 comprises such a diffraction structure or holographic structure that the light beam 3 emitted from the light source 1 is varied according to a predetermined illumination pattern such that the holographic light beam 6 strikes the entire illumination surface 7 and serves to generate the predetermined light function, for example the tail light. The holographic element H1 comprises smaller optical structures than a refractive optical element. The optical structures of the holographic element H1 are not visible—in particular for directions which are not subject to the diffraction conditions—to a viewer such that the holographic element H1 is virtually invisible to a viewer. Light distribution information for the illumination surface 7 of the lens 2 or the illumination pattern is recorded in the holographic element H1. The illumination surface 7 serves as a luminous signature surface, from which the light 6 is diffusely emitted due to the structuring of the illumination surface. The lens 2 is arranged in the main emission direction H in front of the holographic element H1.

The holographic element H1 is preferably configured as a holographic optical element (HOE) which belongs to the class of diffractive optical elements. Compared to conventional refractive optical elements, diffractive optical elements are characterized by significantly smaller optical structures which diffract the light within a limited spectral and angular range. The diffractive optical elements can be executed as gratings, lenses, mirrors, beam splitters, color filters, scatterers or as a combination thereof.

The holographic element H1 is preferably configured as a volume holographic element which is present in the embodiment example according to FIG. 1 as a volume transmission holographic element. The volume holographic element is configured as an emulsion or as a holographic film. The holographic element H1 is preferably configured as a photopolymer in the form of a film. The volume holographic element is configured as a relatively thick hologram, since its grating constant g is always smaller than a thickness d of the film material. The product resulting from the thickness d of the holographic element H1 and the wavelength $\lambda$ used is substantially greater than the square of the grating constant g, see $\lambda \times d \gg g^2$.

Since the grating constant g is relatively small, being located at most within the range of the wavelength $\lambda$ of the light, the grating structure is virtually invisible to the human eye.

If the holographic element H1 is configured as a film, said film can be pre-formed, for example, by deep-drawing. The film is then placed in an injection mold and then oversprayed by a transparent material such that the holographic element H1 is provided as a rigid transparent plate which extends in a plane.

Alternatively, the holographic element film can also be subsequently glued or welded onto the transparent supporting disc, for example by ultrasonic welding.

The light beam 3 is diffracted by the holographic element H1 within a defined, limited angular and spectral range and is emitted as a holographic light beam 6 in the direction of the illumination surface 7.

The illumination surface 7 is part of the lens 2. It is integrally connected with the lens 2. In the present embodiment example, the illumination surface 7 is configured as an illumination profile 8 which extends in the horizontal direction along an arc. The illumination profile 8 is arranged at an elevated level with respect to the remaining parts of the lens 2. The illumination profile 8 extends in the form of a strip. The illumination profile 8 comprises edges 9 located opposite one another which project forwards, the front border of which delimit the illumination surface 7.

According to the present embodiment, the illumination surface 7 which forms a signature surface is exclusively provided with scattering optical elements which are produced by electrical discharge machining or by etching or by lasering or by milling such that the holographic light beam 6 hitting them is scattered further in order to generate the predetermined light distribution. The adjacent parts such as the edge 9 of the illumination profile 8 as well as the relatively large-volume base surface 10 of the lens 2, which extends substantially in a vertical plane, are not provided with the scattering optical elements, but are crystal clear or colored.

The edge 9 as well as the base surface 10 form a non-signature surface of the lighting device which is not impinged upon by the holographic light beam 6. The fact that the edge 9 and the base surface 10 are designed to be free of optics or structures makes it possible to view the internal space of a lighting unit arranged in a housing (which is not shown), favoring the effect of depth of the lighting unit.

The lens 2 is preferably configured as a cover disk covering the housing of the lighting unit.

According to an alternative embodiment of the invention (which is not shown), an additional lighting unit consisting of a further light source and a further optical unit can be arranged in the light housing. This further lighting unit can be used to generate an additional light function. For example, the optical unit of the additional lighting unit can comprise a light guide and/or a reflector and/or a lens. The further light source can, for example, be configured as an LED light source.

According to a second embodiment of the invention according to FIGS. 2 and 3, in contrast to the first embodiment of the invention, a lighting unit is provided, which comprises a lens 12 with multiple, preferably integrally connected illumination surfaces 17, 17', 17". In the present embodiment example, three illumination surfaces 17, 17', 17" are provided, which extend successively in the horizontal direction along a relatively long arc of the lens 12. Associated with the light source 12 are a number of holographic elements H2, H3, H4, with the number coinciding with the number of illumination surfaces 17, 17', 17", said holographic elements forming an optical unit together with the lens 12 of the lighting unit. A light source 1 is associated with each of the holographic elements H2, H3, H4.

The same components or component functions in the embodiment examples are provided with the same reference numerals.

A single holographic element H2, H3, H4 is therefore associated with each of the illumination surfaces 17, 17', 17", each of the holographic light beams 16, 16', 16" emitted by the holographic elements H2, H3, H4 being emitted at a similar acute aperture angle $\Phi_{H2}$, $\Phi_{H3}$ and $\Phi_{H4}$ respectively in the direction of the respective illumination surfaces 17, 17', 17". The holographic elements H2, H3, H4 are aligned to the respective illumination surfaces 17, 17', 17". The illumination surfaces 17, 17', 17" are adjacent to or overlap one another. In the present embodiment example, the illumination surfaces 17, 17', 17" are the same length in the horizontal direction. If the illumination surfaces 17, 17', 17" have a different horizontal extension, the aperture angles of the holographic elements H2, H3, H4 do not have to be equal. In this case, they can be located within a defined aperture angle range, in particular an acute aperture angle range.

As is particularly clearly shown in FIG. 3, the holographic elements H2, H3, H4 are located a distance a from the illumination surface 17, 17' or 17", which is greater than a distance b of the holographic elements H2, H3, H4 from the respective light sources 1. The greater the distance a between the respective holographic elements H2, H3, H4 and the illumination surfaces 17, 17', 17" is, the greater the illumination surface 17, 17', 17" to be lit. The lens 12 according to the second embodiment differs substantially from the lens 1 according to the first embodiment in that the lens 12 has a greater horizontal extension and can therefore cover a larger light housing.

According to another embodiment of the invention according to FIG. 4, only a single holographic element H5 can be associated with the lens 12 according to the second embodiment. Associated with the holographic element H5 are three light sources 1 which provide the necessary luminous flux for the light function. The holographic element H5 comprises such a holographic structure that a holographic light beam 26 is directed or emitted at an obtuse aperture angle $\Phi H5$ onto the multiple illumination surfaces 17, 17', 17". The number of holographic elements can, in this case, be advantageously reduced.

According to a further embodiment example of the invention (which is not shown), a second holographic element can additionally be provided, which comprises such a holographic structure that a light beam 3 of the light source 1 hitting it is scattered in accordance with Lambert's law and is radiated as an additional holographic light beam in the direction of the illumination surface 7 or 17, 17', 17". This additional holographic light beam allows such a scattering of the light function that the scattering optical elements on the illumination surface 7 or 17, 17', 17" can be omitted. The entire lens 2, 12 can therefore be configured such that it is free of optics or free of structures or smooth and allows the light housing to be viewed from outside.

The entire lens 2, 12 including the illumination surface 7 or 17, 17', 17" therefore appears to be transparent and clear when it is not lit, whilst the illumination surface 7 or 17, 17', 17" lights up in a diffuse and uniform manner when the light source 1, 12 is switched on.

According to a further embodiment of the invention (which is not shown), a primary optical element can be provided between the light source 1 and the holographic element H1, H2, H3, H4, H5 in order to focus, for example, a relatively wide light beam 3 in the direction of the holographic element H1, H2, H3, H4, H5. The holographic elements H1, H2, H3, H4, H5 comprise the deflection information for the light so that the illumination surface 7 or 17, 17', 17" is exclusively illuminated.

According to the present embodiment of the invention, the illumination surface 7, 17, 17', 17" is configured as a linear graphical signature surface. Alternatively or additionally, the graphical signature surface can also be configured by other graphical patterns, for example dots, polygons (squares, rectangles, hexagons). Furthermore, it is possible to configure multiple signature surfaces or multi-part signature surfaces, wherein multi-part linear signature surfaces can, for example, be arranged above one another at a distance.

In the aforementioned embodiment examples of the invention, the holographic element H1, H2, H3, H4, H5 is configured as a surface holographic element, in which the holographic structure is integrated in a holographic film which is mounted on a surface of the transparent and preferably rigid supporting surface. Alternatively, the holographic structure can also be integrated in an injection-molded part (additional lens). Alternatively, the holographic element can also be configured as a diffractive optic in the form of a film or in the form of a glass plate or in the form of a plastic additional lens, by means of which the light beam is diffracted within a defined angular and/or spectral range of the same such that the planned light function is generated.

It is understood that the aforementioned characteristics can each be used by themselves or in multiples in any combination. The embodiment examples described are not to be understood to be an exhaustive list, rather they have an exemplary character for describing the invention.

The invention claimed is:

1. A lighting device for generating a light function for a vehicle, the lighting device comprising a light source, a holographic element, and a lens,
   the light source adapted for emitting a light beam in a virtually punctiform manner onto the holographic element,
   the holographic element in the form of a holographic film or holographic layer in which light distribution information is recorded for diffracting the virtually punctiform light beam into a holographic light beam,
   the lens including at least one signature surface struck by the holographic light beam, and including at least one non-signature surface connected at a border to the signature surface, the at least one non-signature surface not being struck by the holographic light beam,
   wherein the at least one signature surface has been subjected to electrical discharge machining or etching or lasering or milling,
   wherein distribution of light onto the lens is brought about by the light transmitted directly from the light source to the holographic element and diffracted by the holographic element, the holographic element serving as a beam shaper for illuminating the at least one signature surface, such that the holographic light beam lights the at least one signature surface of the lens to generate the light function, and
   wherein the at least one signature surface of the lens is configured as a graphical signature surface having a graphical pattern comprising dots or polygons.

2. The lighting device according to claim 1, wherein the at least one signature surface of the lens is an elongated signature surface which extends in a direction of the lens.

3. The lighting device according to claim 1, wherein the holographic element is configured as a volume holographic element, via which the light beam is diffracted within a defined angular and/or spectral range of the same such that a planned light function can be generated.

4. The lighting device according to claim 1, wherein the holographic element is configured as a surface holographic element or as a diffractive optical structure in the form of a film or in the form of a glass plate or in the form of an additional lens made of plastic, via which the light beam is diffracted within a defined angular and/or spectral range of the same such that a light function illuminating the at least one signature surface can be generated.

5. The lighting device according to claim 1, wherein the holographic element includes a holographic film comprising a holographic structure or an injection-molded part comprising a holographic structure, via which the light is diffracted within a defined angular and/or spectral range of the same such that a planned light function can be generated.

6. The lighting device according to claim 1, wherein the light source is a laser diode.

7. The lighting device according to claim 1, wherein the light source is a LED from which the light beam is emitted in a virtually punctiform manner.

8. A lighting device for generating a light function for a vehicle, the lighting device comprising a light source, a holographic element, and a lens,
   the light source adapted for emitting a light beam in a virtually punctiform manner onto the holographic element,
   the holographic element in the form of a holographic film or holographic layer in which light distribution information is recorded for diffracting the virtually punctiform light beam into a holographic light beam,
   the lens including at least one signature surface struck by the holographic light beam, and including at least one non-signature surface connected at a border to the signature surface, the at least one non-signature surface not being struck by the holographic light beam,
   wherein distribution of light onto the lens is brought about by the light transmitted directly from the light source to the holographic element and diffracted by the holographic element, the holographic element serving as a beam shaper for illuminating the at least one signature surface, such that the holographic light beam lights the at least one signature surface of the lens to generate the light function, and
   wherein the at least one signature surface of the lens is configured as a graphical signature surface having a graphical pattern comprising dots or polygons, and
   wherein a second holographic element is associated with the at least one signature surface, said second holographic element comprising such a holographic structure that light hitting it is scattered in accordance with Lambert's law and is radiated as an additional holographic light beam.

* * * * *